(12) United States Patent
Vanman et al.

(10) Patent No.: US 11,497,299 B2
(45) Date of Patent: Nov. 15, 2022

(54) MAGNETIC BODY-WORN MOUNTING SYSTEM AND METHOD

(71) Applicant: WatchGuard, Inc., Allen, TX (US)

(72) Inventors: Robert V. Vanman, McKinney, TX (US); Brian Mooney, Plano, TX (US); Michael Charles Wuensch, Carrollton, TX (US)

(73) Assignee: WATCHGUARD VIDEO INC., Allen, TX (US)

( * ) Notice: Subject to any disclaimer, the term of this patent is extended or adjusted under 35 U.S.C. 154(b) by 774 days.

(21) Appl. No.: 16/452,375

(22) Filed: Jun. 25, 2019

(65) Prior Publication Data

US 2020/0390225 A1 Dec. 17, 2020

Related U.S. Application Data

(60) Provisional application No. 62/860,566, filed on Jun. 12, 2019.

(51) Int. Cl.
| | |
|---|---|
| *A45F 5/02* | (2006.01) |
| *F16M 11/04* | (2006.01) |
| *G03B 17/56* | (2021.01) |
| *F16M 13/04* | (2006.01) |
| *F16M 13/02* | (2006.01) |
| *F16B 1/00* | (2006.01) |

(52) U.S. Cl.
CPC .............. *A45F 5/02* (2013.01); *F16M 11/041* (2013.01); *F16M 13/02* (2013.01); *F16M 13/04* (2013.01); *G03B 17/561* (2013.01); *F16B 2001/0035* (2013.01); *G03B 17/566* (2013.01)

(58) Field of Classification Search
CPC ........................... A45F 5/02–08; F16M 13/04
See application file for complete search history.

(56) References Cited

U.S. PATENT DOCUMENTS

| | | | | | |
|---|---|---|---|---|---|
| 5,040,299 | A | * | 8/1991 | Hwang ................ | B25H 1/0078 266/70 |
| 5,819,381 | A | * | 10/1998 | Lake ........................ | A41F 3/02 24/562 |

(Continued)

OTHER PUBLICATIONS

Photographs of a device displayed at the annual conference of the International Association of Chiefs of Police, Oct. 21-24, 2017.

(Continued)

*Primary Examiner* — Leon W Rhodes, Jr.

(57) ABSTRACT

A mounting device includes an internal member and an external member. The internal member includes first magnets disposed in an inner face of the internal member, a shock cavity formed in the inner face of the internal member, and an insert disposed in the shock cavity. The external member is removably coupled to the internal member. The external member includes second magnets disposed in an inner face of the external member. The second magnets are rotatable between a locking position and a release position. The external member also includes a shock ridge formed in the inner face of the external member. The shock ridge is received into the shock cavity and compresses the insert such that impact is dampened during coupling of the internal member to the external member.

19 Claims, 15 Drawing Sheets

(56) References Cited

U.S. PATENT DOCUMENTS

| | | | | |
|---|---|---|---|---|
| 6,405,415 | B1* | 6/2002 | Meeks | A44B 99/00 |
| | | | | 24/511 |
| 6,707,360 | B2* | 3/2004 | Underwood | B23Q 3/1546 |
| | | | | 269/8 |
| 7,076,885 | B2* | 7/2006 | Potter | G01B 3/1056 |
| | | | | 33/DIG. 1 |
| 7,469,869 | B2* | 12/2008 | Killion | G09F 7/04 |
| | | | | 24/351 |
| 9,397,719 | B1* | 7/2016 | Schmidt | F16M 11/24 |
| 10,082,240 | B2* | 9/2018 | Meuret | F16M 11/046 |
| 10,405,995 | B2* | 9/2019 | Song | A61F 2/80 |
| 2009/0289090 | A1 | 11/2009 | Fullerton et al. | |
| 2010/0067833 | A1 | 3/2010 | Jin et al. | |
| 2011/0273253 | A1 | 11/2011 | Fullerton et al. | |
| 2013/0221189 | A1* | 8/2013 | Kubin | F16M 13/04 |
| | | | | 248/683 |
| 2015/0380139 | A1* | 12/2015 | Hsu | H04M 1/04 |
| | | | | 335/285 |
| 2016/0198813 | A1 | 7/2016 | Fiedler et al. | |
| 2018/0049538 | A1* | 2/2018 | Vanman | A45F 3/00 |
| 2018/0064235 | A1* | 3/2018 | Alexander | A45F 5/02 |
| 2019/0198212 | A1* | 6/2019 | Levy | F16M 11/22 |

OTHER PUBLICATIONS

Patents Act 1977—Combined Search and Examination Report under Sections 17 & 18(3), for corresponding Application No. GB2008399.4, filed Jun. 4, 2020, dated Oct. 20, 2020.

\* cited by examiner

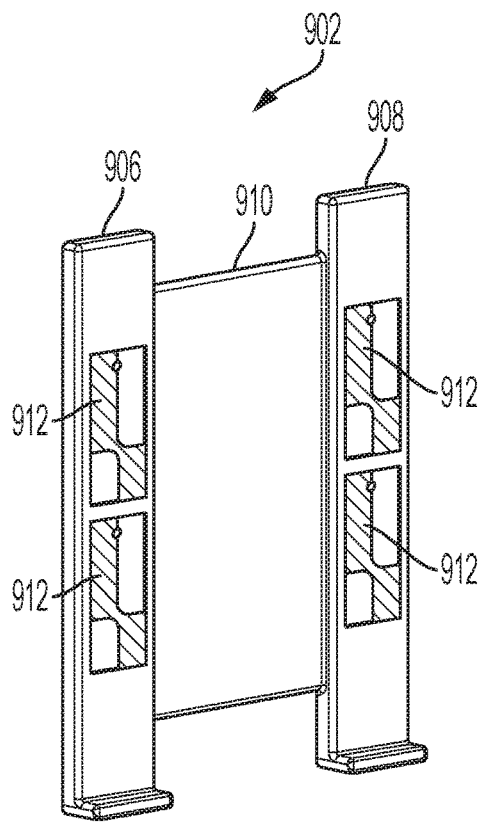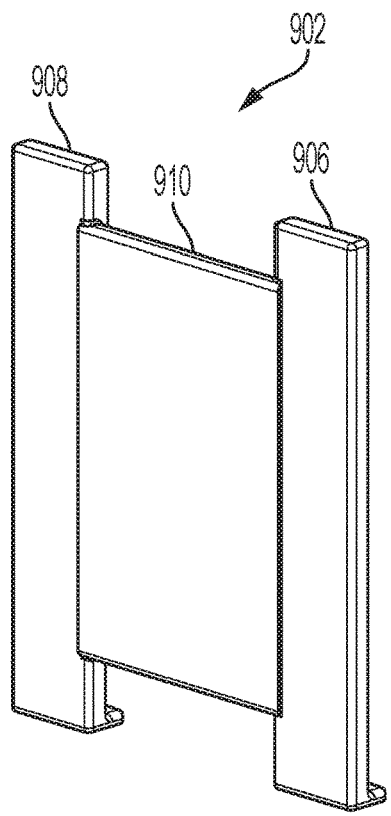
FIG. 9A        FIG. 9B
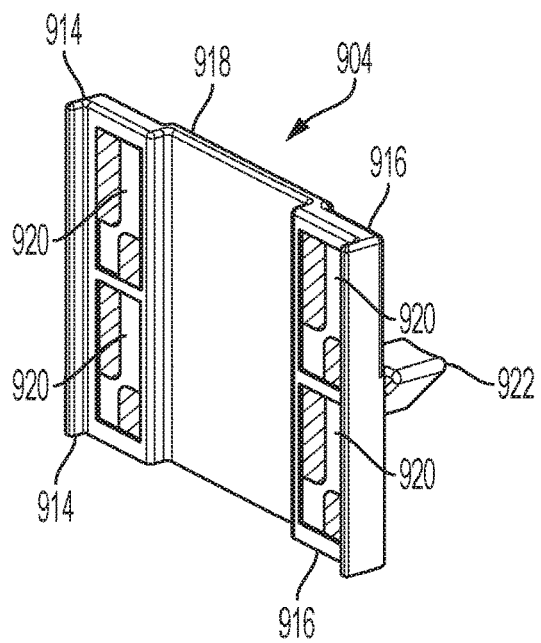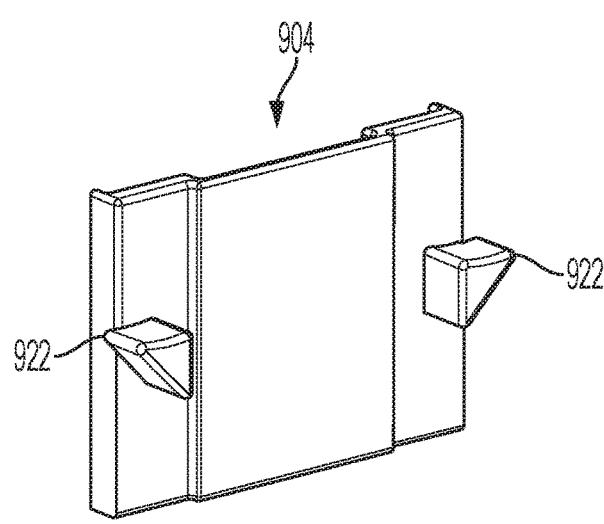
FIG. 9C        FIG. 9D

MAGNETIC BODY-WORN MOUNTING SYSTEM AND METHOD

CROSS-REFERENCE TO RELATED APPLICATIONS

This patent application claims priority from U.S. patent application Ser. No. 62/860,566, filed on Jun. 12, 2019. U.S. patent application Ser. No. 62/860,566 is incorporated by reference.

The present disclosure relates generally to camera-mounting systems and more particularly, but not by way of limitation, to camera-mounting systems utilizing selectively-rotatable, multi-pole magnets.

BACKGROUND

This section provides background information to facilitate a better understanding of the various aspects of the disclosure. It should be understood that the statements in this section of this document are to be read in this light, and not as admissions of prior art.

Cameras are important evidence-gathering tools utilized by police departments and security agencies. As such, body-worn cameras are common equipment for law-enforcement and security personnel. Such body-worn cameras are typically clipped or otherwise mounted to an individual's clothing in a manner that allows removal when not in use. It is important that the body-worn camera maintain attachment to the individual's clothing while also maintaining a proper focal aim. Thus, the camera must not be easily dislodged from the individual's clothing, or have its focal aim altered during periods of intense activity such as, for example, during foot chases or hand-to-hand altercations with suspects.

SUMMARY

A mounting device includes an internal member and an external member. The internal member includes first magnets disposed in an inner face of the internal member, a shock cavity formed in the inner face of the internal member, and an insert disposed in the shock cavity. The external member is removably coupled to the internal member. The external member includes second magnets disposed in an inner face of the external member. The second magnets are rotatable between a locking position and a release position. The external member also includes a shock ridge formed in the inner face of the external member. The shock ridge is received into the shock cavity and compresses the insert such that impact is dampened during coupling of the internal member to the external member.

A mounting device includes an internal member and an external member. The internal member includes first magnets disposed in an inner face of the internal member. The external member is removably coupled to the internal member and includes second magnets disposed in an inner face of the external member, a first release arm extending from the external member and operatively coupled to the second magnets, and a second release arm extending from the external member and operatively coupled to the second magnets. Actuation of the first release arm and the second release arm rotates the second magnets from a locking position to a release position. The release position facilitating de-coupling of the external member from the internal member.

A method of using a mounting device includes aligning an external member with an internal member, coupling the external member to the internal member via a magnetic force of attraction between first magnets disposed in the internal member and second magnets disposed in the external member, actuating a first release arm and a second release arm that are coupled to the external member, actuation of the first release arm and the second release arm causing the second magnets to rotate from a locking position to a release position, and de-coupling the external member from the internal member.

A mounting device includes an internal member including a first magnet disposed therein and an external member removably coupled to the internal member and including a second magnet disposed therein. The external member, when coupled to the internal member, is slidably movable relative to the internal member between a locking position and a release position. The external member includes a finger rest disposed on the external member and configured to facilitate application of force to the external member to induce sliding movement of the external member relative to the internal member. The sliding movement of the external member from the locking position to the release position reduces a magnetic force of attraction between the external member and the internal member and increases a magnetic force of repulsion between the external member and the internal member.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 9A is a front perspective view of an internal member of a sliding mounting device;

FIG. 9B is a back perspective view of the internal member of FIG. 9A;

FIG. 9C is front perspective view of an external member of the sliding mounting device;

FIG. 9D is a back perspective view of the external member of FIG. 9C;

DETAILED DESCRIPTION

Various embodiments will now be described more fully with reference to the accompanying drawings. The disclosure may, however, be embodied in many different forms and should not be construed as limited to the embodiments set forth herein.

Figure 1:
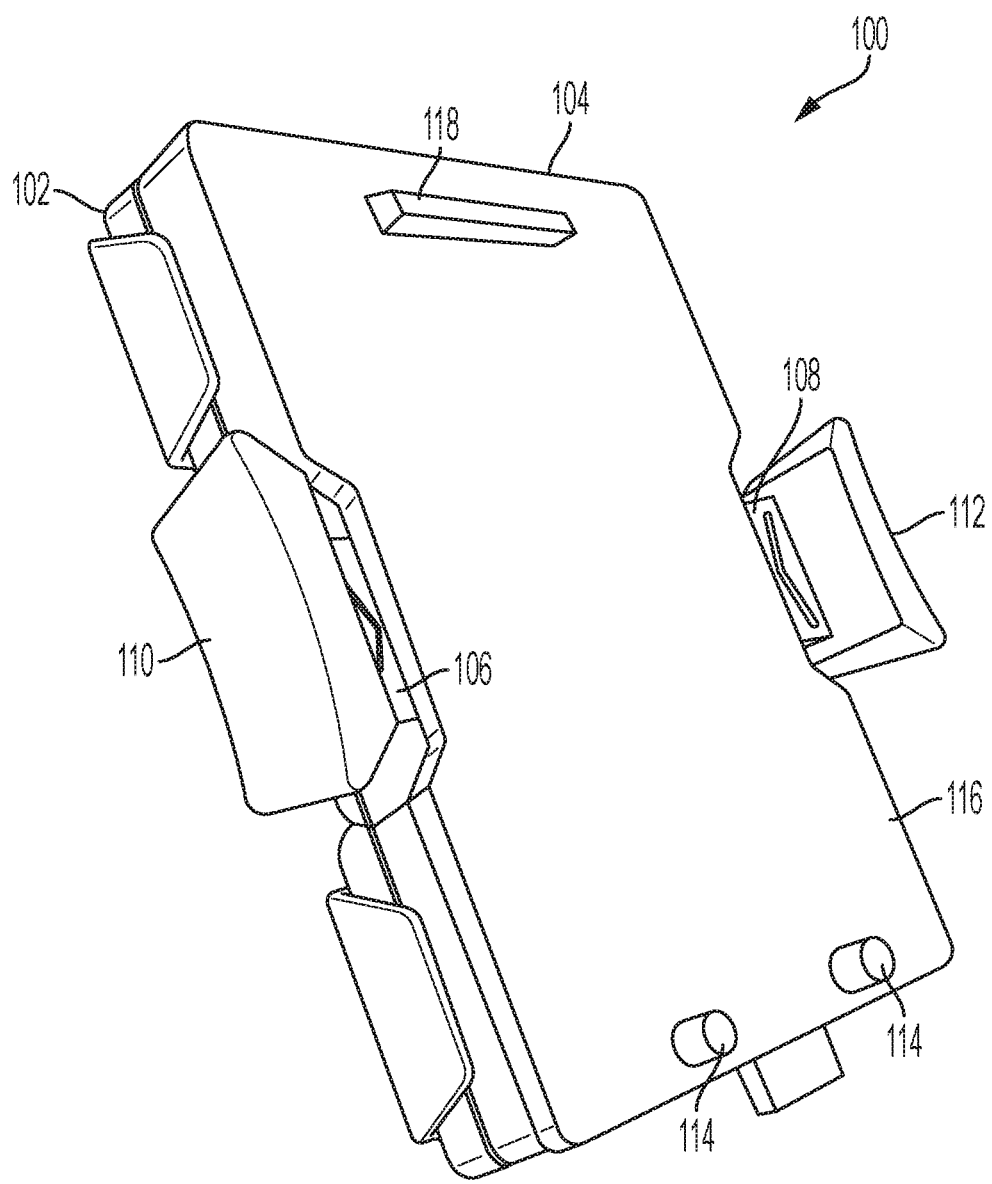
FIG. 1 is a perspective view of a mounting device according to aspects of the disclosure.

FIG. 1 is a perspective view of a mounting device 100. The mounting device includes an internal member 102 and an external member 104 that is removably coupled to the internal member 102. In various embodiments, a camera (not shown) is coupled to the external member 104. Alignment protrusions 114 extend outwardly from an outer face 116 of the external member 104. In various embodiments, the alignment protrusions 114 facilitate centering and proper alignment of the camera during use. An attachment groove 118 is disposed on the outer face 116. In various embodiments, the camera is releasably coupled to the attachment groove 118.

Still referring to FIG. 1, a first release arm 106 and a second release arm 108 extend from opposite sides of the external member 104. While the first release arm 106 and the second release arm 108 are illustrated by way of example in FIG. 1 as being aligned along a common axis, the first release arm 106 and the second release arm 108 may, in various embodiments, be positioned at any location on an edge of the external member 104 and may not be aligned with each other. A first finger rest 110 is located at a distal end of the first release arm 106 and a second finger rest 112 is located at a distal end of the second release arm 108. In various embodiments, however, the first finger rest 110 and the second finger rest 112 may be omitted.

Still referring to FIG. 1, in various embodiments, the internal member 102 and the external member 104 are constructed of, for example, a lightweight, rigid material such as, for example, various polymers. In various embodiments, the first release arm 106 and the second release arm 108 are constructed of, for example, a lightweight, rigid material such as, for example, aluminum.

Figure 2:
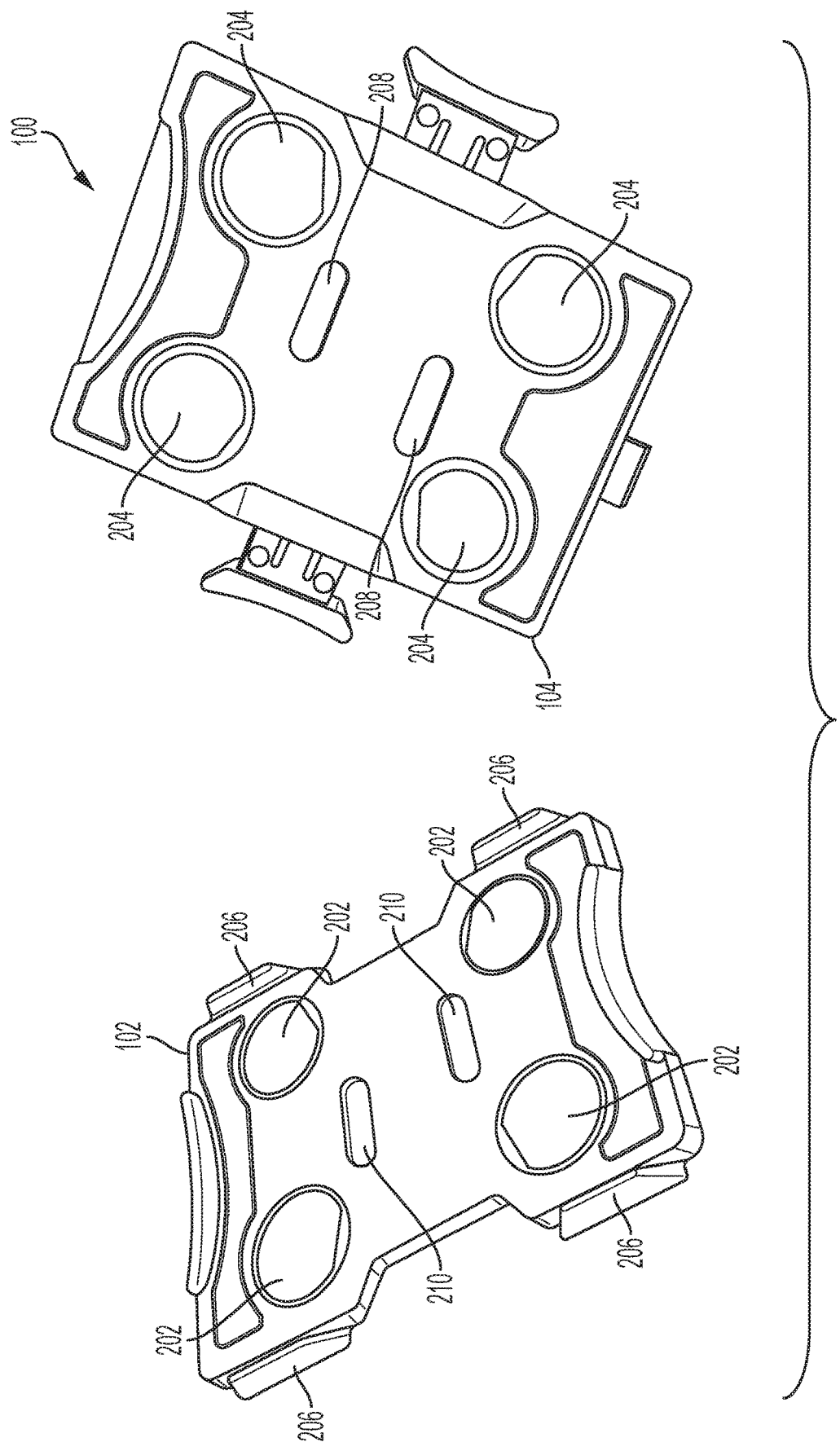
FIG. 2 is an exploded view of the mounting device of FIG. 1.

FIG. 2 is an exploded view of the mounting device 100. The internal member 102 includes first magnets 202 and the external member 104 includes second magnets 204. By way of example, the internal member 102 is shown in FIG. 2 as including four first magnets 202; however, the internal member 102 may, in various embodiments, include any number of first magnets 202. Likewise, the external member 104 is shown by way of example in FIG. 2 as including four second magnets 204; however the external member 104 may, in various embodiments, include any number of second magnets 204. Alignment tabs 206 are disposed around a perimeter of the internal member 102 and protrude from the internal member 102. In various embodiments, the alignment tabs 206 facilitate centering and alignment in the horizontal and vertical directions of the internal member 102 with the external member 104. Additionally, alignment ridges 208 protrude from the external member 104. The alignment ridges 208 are received into corresponding alignment slots 210 on the internal member 102 when the external member 104 is coupled to the internal member 102.

Figure 3:
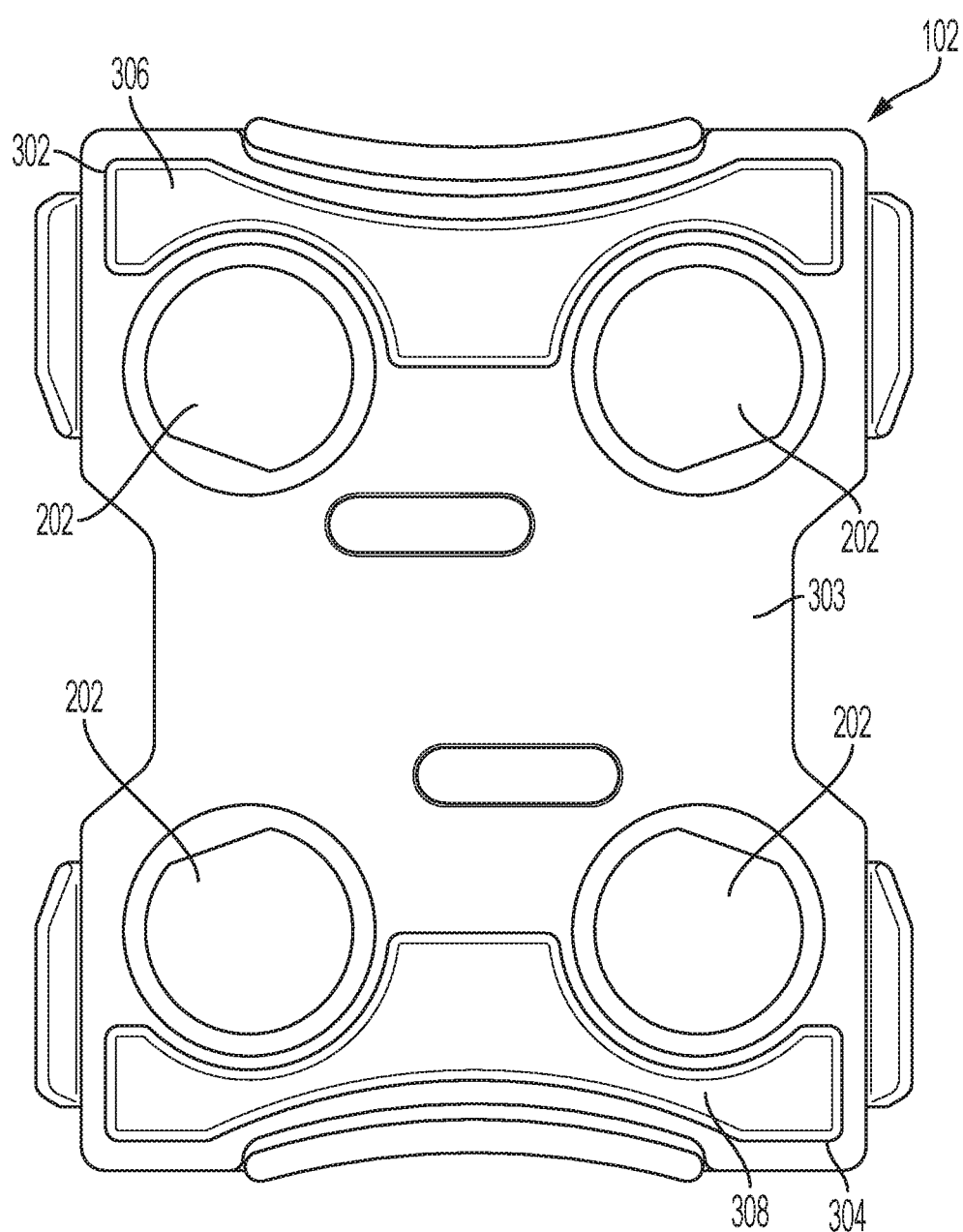
FIG. 3 is a plan view of an internal member according to aspects of the disclosure.

FIG. 3 is a plan view of the internal member 102. An upper shock cavity 302 is formed in an upper aspect of an inner face 303 of the internal member 102 and a lower shock cavity 304 is formed in a lower aspect of the inner face 303. The upper shock cavity 302 and the lower shock cavity 304 are formed outwardly of the first magnets 202; however, in various embodiments, the upper shock cavity 302 and the lower shock cavity 304 may be formed at any location on the inner face 303. In various embodiments, the first magnets 202 are recessed into the inner face 303 such that an upper face of the first magnets 202 is not co-planar with the inner face 303. Recession of the first magnets 202 into the inner face 303 defines a gap between the first magnets 202 and the second magnets 204 and prevents impact of the first magnets 202 with the second magnets 204 during coupling of the internal member 102 with the external member 104. Such an arrangement prevents damage such as, for example, cracking of the first magnets 202 and the second magnets 204.

Still referring to FIG. 3, a first insert 306 is received into the upper shock cavity 302 and a second insert 308 is received into the lower shock cavity 304. In various embodiments, the first insert 306 completely fills the upper shock cavity 302 and the second insert 308 completely fills the lower shock cavity 304. In various embodiments, the first insert 306 and the second insert 308 are constructed of a foam material such as, for example, urethane foam sold under the trademark Poron® ShockSeal™ by Rogers Corporation. In various embodiments, the compression of the first insert 306 and the second insert 308 varies with the density of the foam and a surface area that is in contact with the first insert 306 and the second insert 308. In various embodiments, the first insert 306 and the second insert 308 are constructed of a foam having a density of, for example, approximately 9 lb/ft$^3$ to approximately 20 lb/ft$^3$, a compression force deflection of, for example, 2 psi to approximately 13 psi, a thickness of approximately 0.021 inches to approximately 0.375 inches, and a maximum compression set of approximately 0.6% to approximately 5%; however, various properties of the first insert 306 and the second insert 308 could vary.

Figure 4:
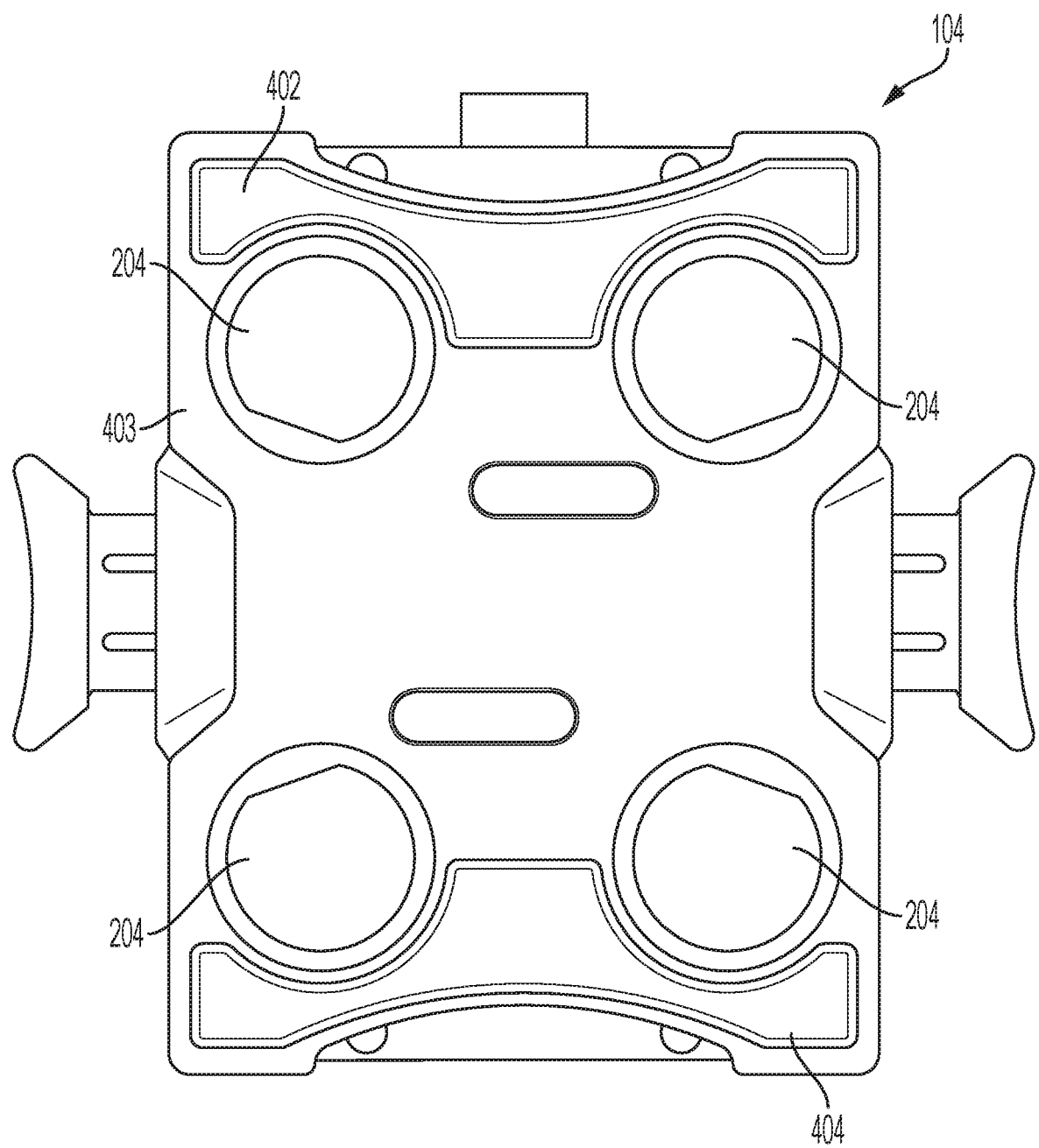
FIG. 4 is a plan view of an external member according to aspects of the disclosure.

FIG. 4 is a plan view of an external member 104. An upper shock ridge 402 is formed on an upper aspect of an inner face 403 of the external member 104. A lower shock ridge 404 is formed on a lower aspect of the inner face 403. The upper shock ridge 402 and the lower shock ridge 404 are formed outwardly of the second magnets 204; however, in various embodiments, the upper shock ridge 402 and the lower shock ridge 404 may be formed at any location on the inner face 403. The upper shock ridge 402 is formed with a shape that facilitates the upper shock ridge 402 being received into the upper shock cavity 302 when the external member 104 is coupled to the internal member 102. Similarly, the lower shock ridge 404 is formed with a shape that facilitates the lower shock ridge 404 being received into the lower shock cavity 304 when the external member 104 is coupled to the internal member 102.

Referring now to FIGS. 3-4 collectively, when the external member 104 is coupled to the internal member 102, the upper shock ridge 402 compresses the first insert 306 that is disposed in the upper shock cavity 302. Likewise, the lower shock ridge 404 compresses the second insert 308 that is disposed in the lower shock cavity 304. Compression of the first insert 306 and the second insert 308 dampens the impact of the external member 104 against the internal member 102 and reduces the likelihood of damage to, for example, the first magnets 202 and the second magnets 204. In various embodiments, the compression of the first insert 306 and the second insert 308 varies with the density of the foam and a surface area that is in contact with the first insert 306 and the second insert 308.

Figure 5:
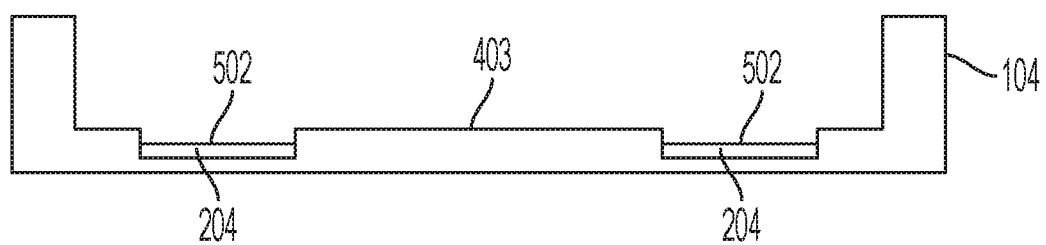
FIG. 5 is a cross-sectional view of the external member according to aspects of the disclosure.

FIG. 5 is a cross-sectional view of the external member 104. An upper face 502 of the second magnets 204 is recessed into the inner face 403 such that the upper face 502 is not co-planar with the inner face 403. Recession of the second magnets 204 into the inner face 403 defines a gap between the first magnets 202 and the second magnets 204 and prevents impact of the first magnets 202 with the second magnets 204 during coupling of the internal member 102 with the external member 104. Such an arrangement prevents damage such as, for example, cracking of the second magnets 204.

Figure 6A:
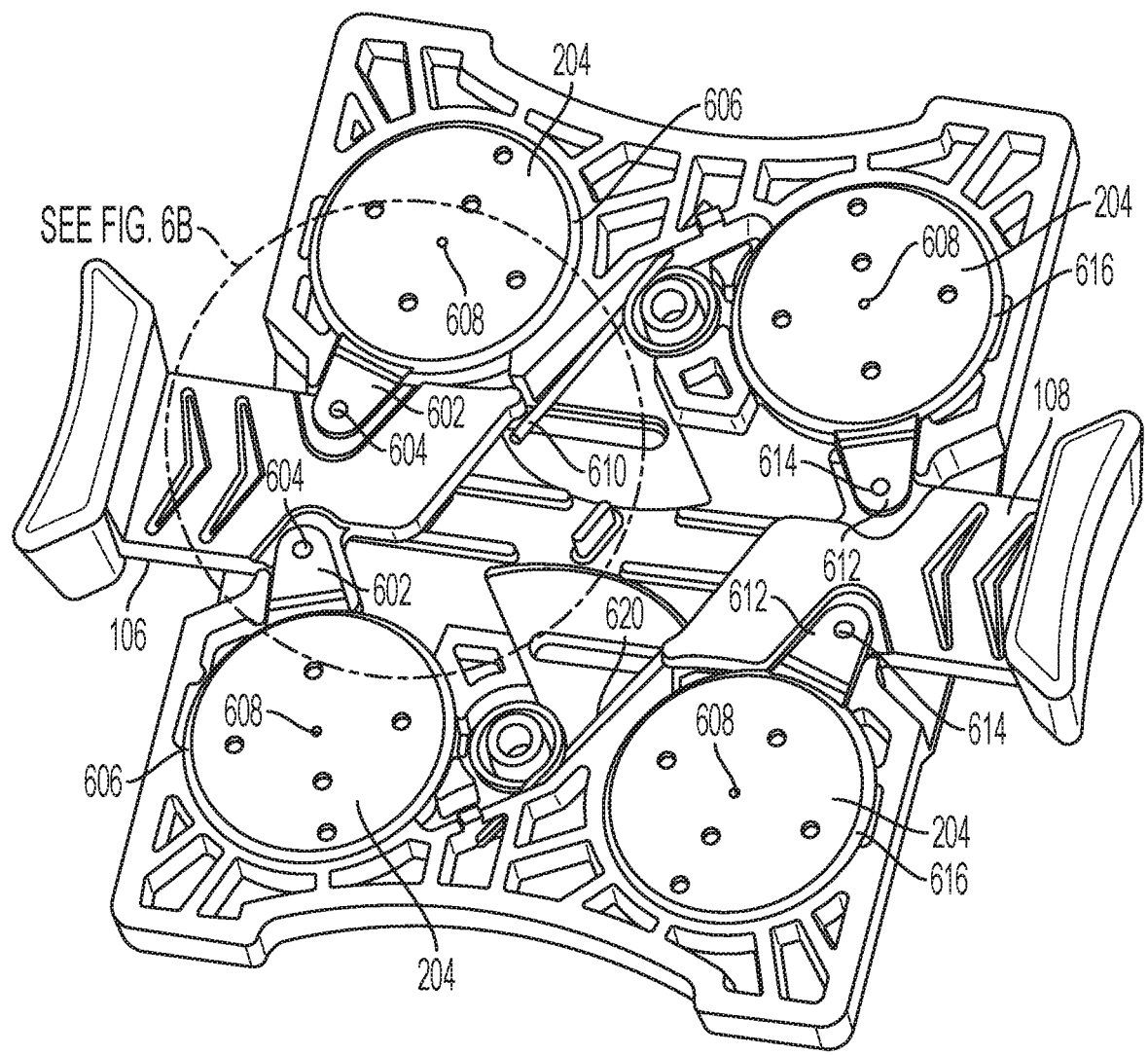
FIG. 6A is a plan view of the external member illustrating interior components according to aspects thereof.
Figure 6B:
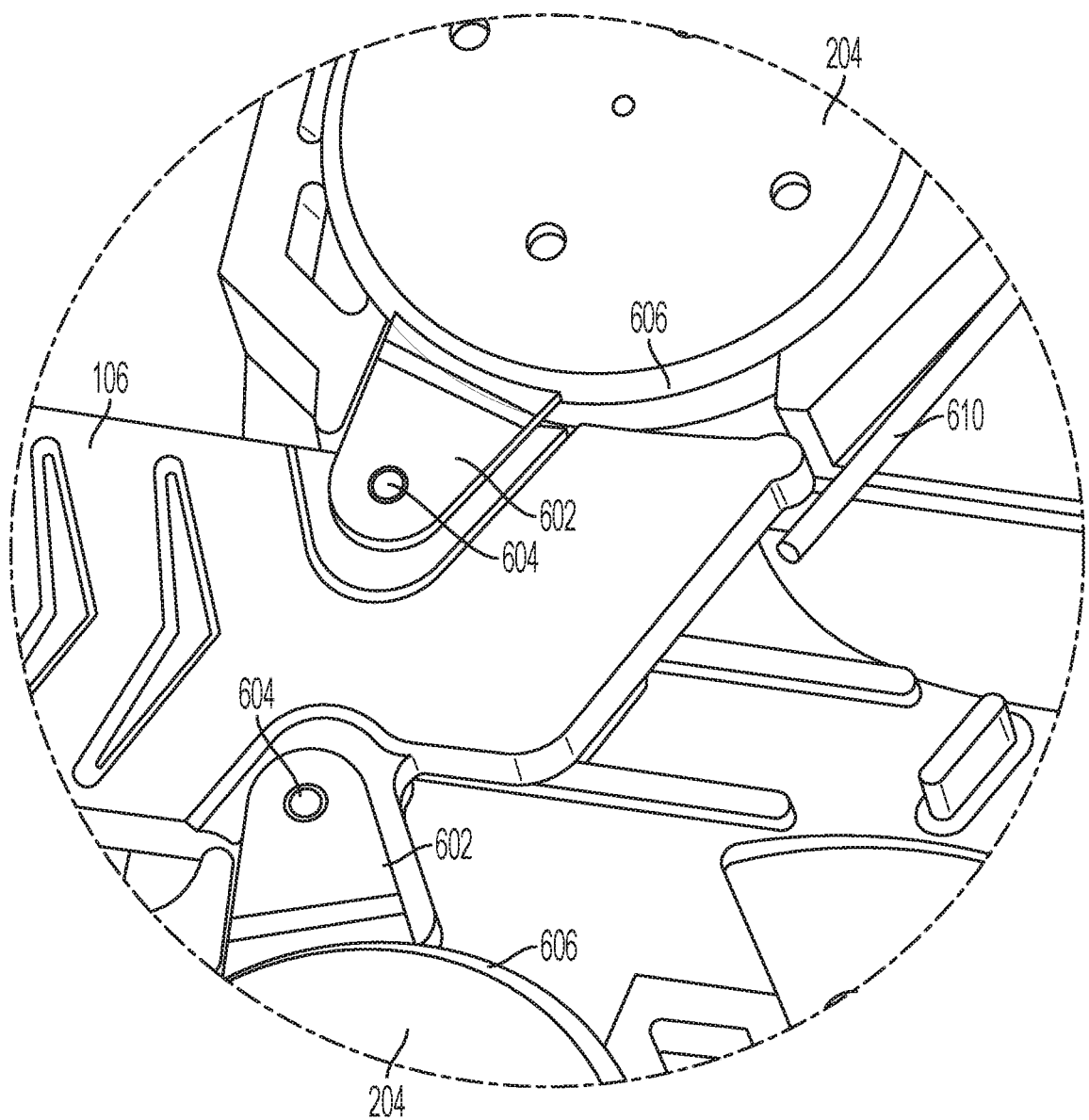
FIG. 6B is a detail view illustrating the internal features of FIG. 6A.

FIG. 6A is a plan view illustrating internal features of the external member 104. FIG. 6B is a detail view illustrating the internal features of the external member 104. Referring to FIGS. 6A and 6B collectively, the first release arm 106 is operatively coupled to a first cam 602. In various embodiments, the first release arm 106 is coupled to the first cam 602 via, for example, a pin 604. The first cam 602 is coupled to a first magnet housing 606. In various embodiments, the first cam 602 is integrally formed with the first magnet housing 606; however, in other embodiments, the first cam 602 and the first magnet housing 606 may be formed separately and coupled together through any appropriate joining method. A magnet of the second magnets 204 is disposed within the first magnet housing 606. The second magnet 204, the first magnet housing 606, and the first cam 602 are able to rotate about an axis 608 of the first magnet housing 606 between a locking position and a release position. In a typical embodiment, rotation is in a plane that is parallel to a plane of the inner face 403. A first spring 610 engages the first release arm 106 and biases the first release arm 106 outwardly from the center of the external member 104. The first spring 610 is shown by way of example in FIGS. 6A and 6B as being a torsion spring; however, in other embodiments, a linear spring could be utilized.

Still referring to FIGS. 6A and 6B, the second release arm 108 is operatively coupled to a second cam 612. In various embodiments, the second release arm 108 is coupled to the second cam 612 via, for example, a pin 614. The second cam 612 is coupled to a second magnet housing 616. In various embodiments, the second cam 612 is integrally formed with the second magnet housing 616; however, in other embodiments, the second cam 612 and the second magnet housing 616 may be formed separately and coupled together through any appropriate joining method. A magnet of the second magnets 204 is disposed within the second magnet housing 616. The second magnet 204, the second magnet housing 616, and the second cam 612 are able to rotate about an axis 608 of the second magnet housing 616 between a locking position and a release position. In a typical embodiment, rotation is in a plane that is parallel to a plane of the inner face 403. A second spring 620 engages the second release arm 108 and biases the second release arm 108 outwardly from the center of the external member 104. The second spring 620 is shown by way of example in FIG. 6 as being a torsion spring; however, in other embodiments, a linear spring could be utilized.

Still referring to FIGS. 6A and 6B, during operation, when it is desired to de-couple the external member 104 from the internal member 102, the first release arm 106 and the second release arm 108 are compressed towards a center of the external member 104. Movement of the first release arm 106 and the second release arm 108 causes movement of the first cam 602 and the second cam 612, respectively. Movement of the first cam 602 and the second cam 612 transmits a moment to the first magnet housing 606 and the second magnet housing 616 respectively, which induces rotation of the first magnet housing 606 and the second magnet housing 616 from the locking position to the release position. When pressure is released from the first release arm 106 and the second release arm 108, the first spring 610 and the second spring 620 return the first release arm 106 and the second release arm 108 to the locking position. Because the first release arm 106 actuates the first magnet housing 606 and the second release arm 108 actuates the second magnet housing 616, the arrangement described in FIGS. 6A and 6B ensures that the external member 104 will not decouple from the internal member 102 if only one of the first release arm 106 and the second release arm 108 is actuated. Such an arrangement prevents accidental release of the external member 104 from the internal member 102.

Figure 7B:
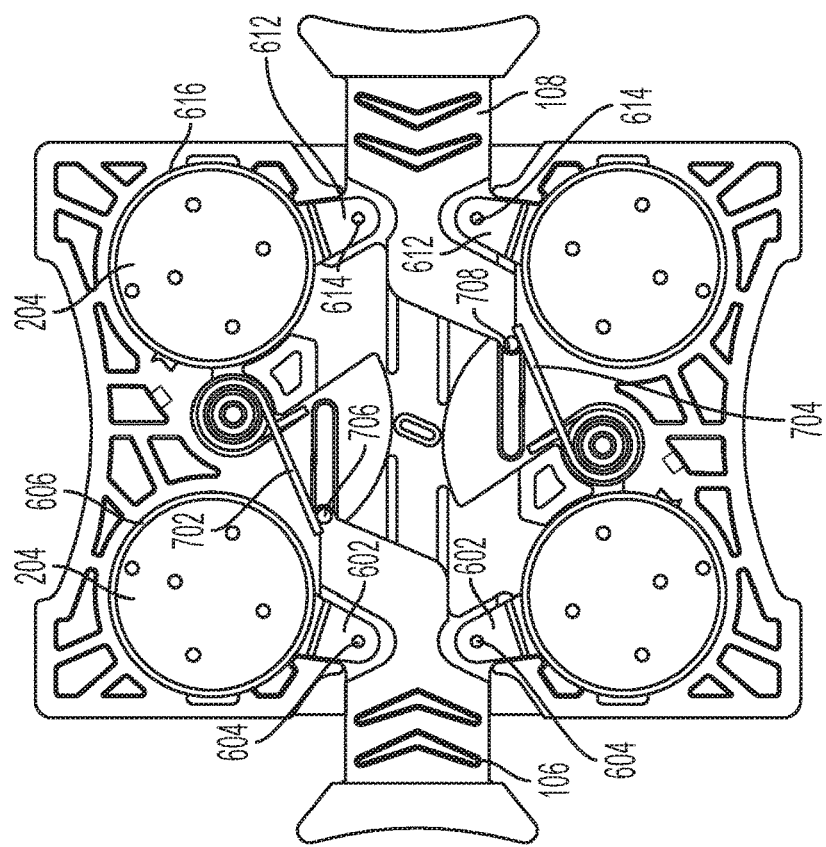
FIG. 7B is a plan view of the alternative external member of FIG. 7A in a release position.
Figure 7A:
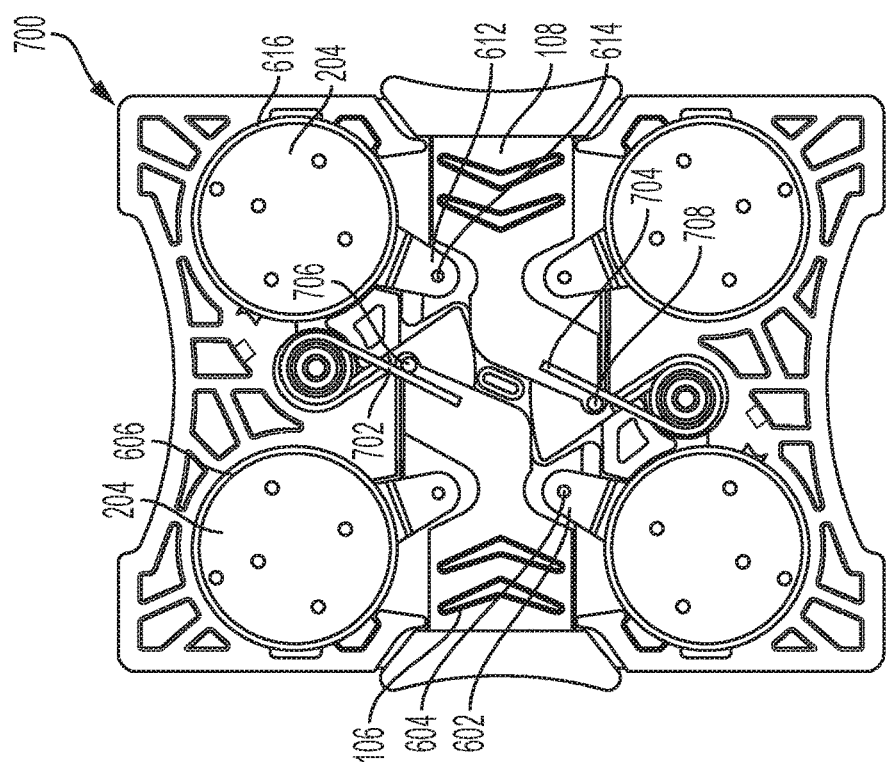
FIG. 7A is a plan view of an alternative external member in a locking position according to aspects of the disclosure.

FIG. 7A is a plan view of an alternative external member 700 in a locked position. FIG. 7B is a plan view of the alternative external member 700 in a release position. The alternative external member 700 is of similar construction to the external member 104; however, in the alternative external member 700, movement of the first release arm 106 and the second release arm 108 is biased by a first spring 702 and a second spring 704. In various embodiments, a first hook 706 is disposed on the first release arm 106 and engages the first spring 702. A second hook 708 is disposed on the second release arm 108 and engages the second spring 704. The first hook 706 and the second hook 708 facilitate transmission of a force to the first spring 702 and the second spring 704, respectively, when the first release arm 106 and the second release arm 108 are moved outwardly from the center of the alternative external member 700. The first spring 702 and the second spring 704 bias movement of the first release arm 106 and the second release arm 108 inwardly towards a center of the alternative external member 700.

Still referring to FIGS. 7A and 7B, during operation, when it is desired to de-couple the alternative external member 700 from the internal member 102, the first release arm 106 and the second release arm 108 are pulled away from a center of the alternative external member 700. Movement of the first release arm 106 and the second release arm 108 causes movement of the first cam 602 and the second cam 612, respectively. Movement of the first cam 602 and the second cam 612 transmits a moment to the first magnet housing 606 and the second magnet housing 616 respectively, which induces rotation of the first magnet housing 606 and the second magnet housing 616 from the locking position to the release position. When tension is released from the first release arm 106 and the second release arm 108, the first spring 702 and the second spring 704 return the first release arm 106 and the second release arm 108, respectively, to the locking position. Because the first release arm 106 actuates the first magnet housing 606 and the second release arm 108 actuates the second magnet housing 616, the arrangement described in FIG. 7 ensures that the alternative external member 700 will not decouple from the internal member 102 if only one of the first release arm 106 and the second release arm 108 is actuated. Such an arrangement prevents accidental release of the alternative external member 700 from the internal member 102.

Figure 8A:
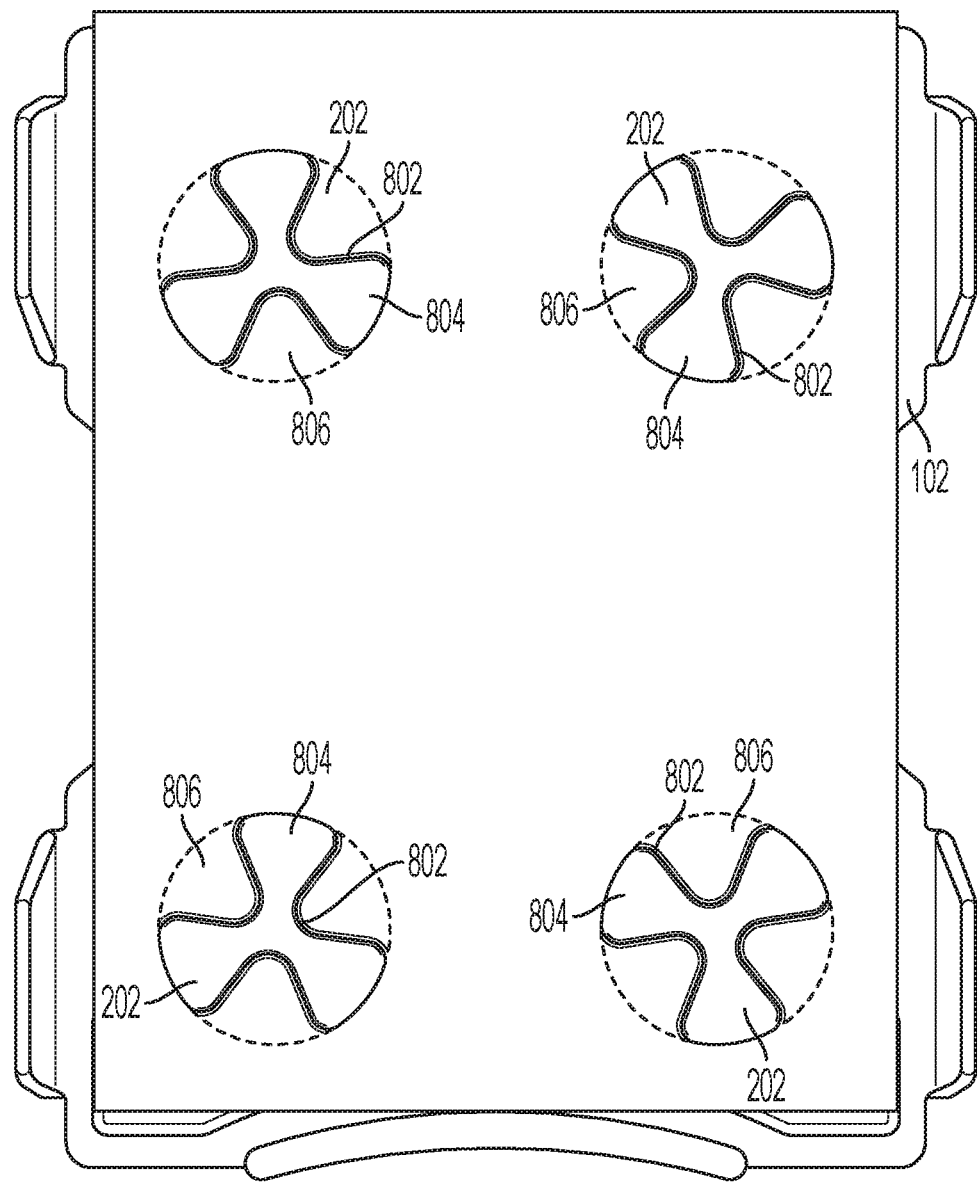
FIG. 8A is a diagrammatic view of the internal member illustrating magnetic pole pairs according to aspects of the disclosure.

FIG. 8A is a diagrammatic view of the internal member 102 illustrating magnetic pole pairs. The first magnets 202 and the second magnets 204 are formed with a plurality of magnetic pole pairs on a surface thereof. In various embodiments, the first magnets 202 and the second magnets 204 could be, for example, Nickle, Copper, Epoxy magnets of the type manufactured by, for example Polymagnet® Correlated Magnetics. By way of example, the first magnets 202 are illustrated in FIG. 8A as having a boundary 802 that separates a first magnetic pole 804, disposed in an interior region of the boundary and a second, oppositely-charged, magnetic pole 806 disposed in a region exterior of the boundary. In various other embodiments, however, the first magnetic pole 804 and the second magnetic pole 806 could be formed in any appropriate arrangement. By way of example, the first magnetic pole 804 is illustrated in FIG. 8A as being a north pole and the second magnetic pole 806 is illustrated as being a south pole; however, in other embodiments, the polarity of the first magnetic pole 804 and the second magnetic pole 806 could be reversed. In various embodiments, the first magnets 202 are fixed in the internal member 102 and do not rotate.

Figure 8B:
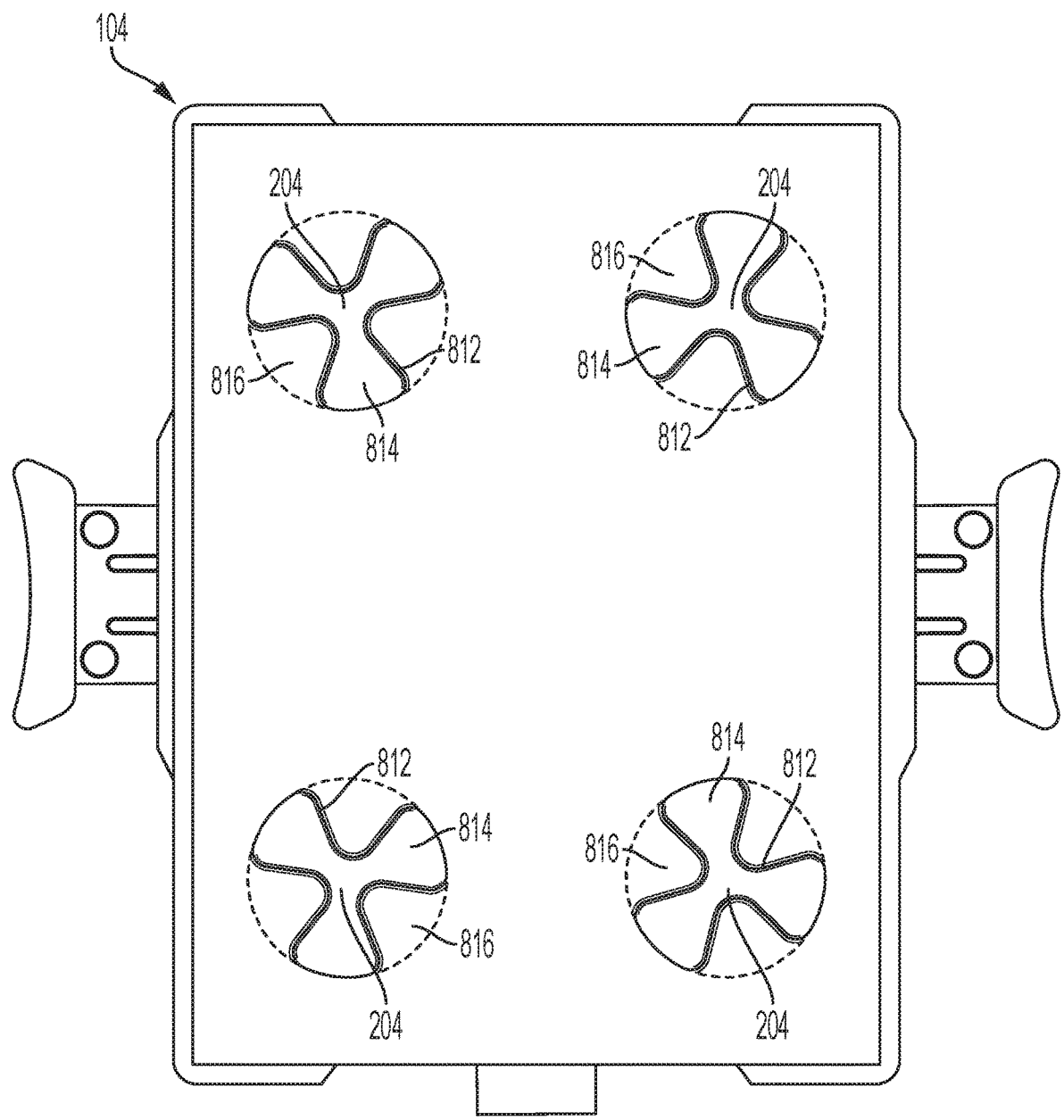
FIG. 8B is a diagrammatic view of the external member in a locking position illustrating magnetic pole pairs according to aspects of the disclosure.

FIG. 8B is a diagrammatic view of the external member 104 in a locking position illustrating magnetic pole pairs. The second magnets 204 include a boundary 812 that separates a first magnetic pole 814 from a second, oppositely-charged, magnetic pole 816. In various embodiments, the first magnetic pole 814 and the second magnetic pole 816 are arranged with a generally similar shape to the arrangement described above with respect to the first magnets 202. However, the first magnetic pole 814 and the second magnetic pole 816 are arranged so that, when the second magnets 204 are positioned in the locking position, the first magnetic pole 814 of the second magnets 204 aligns with the second magnetic pole 806 of the first magnets 202. Likewise, the second magnet pole 816 of the second magnets 204 aligns with the first magnetic pole 804 of the first magnets 202. Such an arrangement results in a magnetic force of attraction between the first magnets 202 and the second magnets 204. Such a force of attraction facilitates coupling and holding of the external member 104 to the internal member 102. In various embodiments, the first magnets 202 and the second magnets 204 include pole pairs that are arranged to provide, for example, approximately 30N to approximately 40N of attractive force when the first magnetic pole 814 of the second magnets 204 aligns with the second magnetic pole 806 of the first magnets 202 and the second magnet pole 816 of the second magnets 204 aligns with the first magnetic pole 804 of the first magnets 202.

Figure 8C:
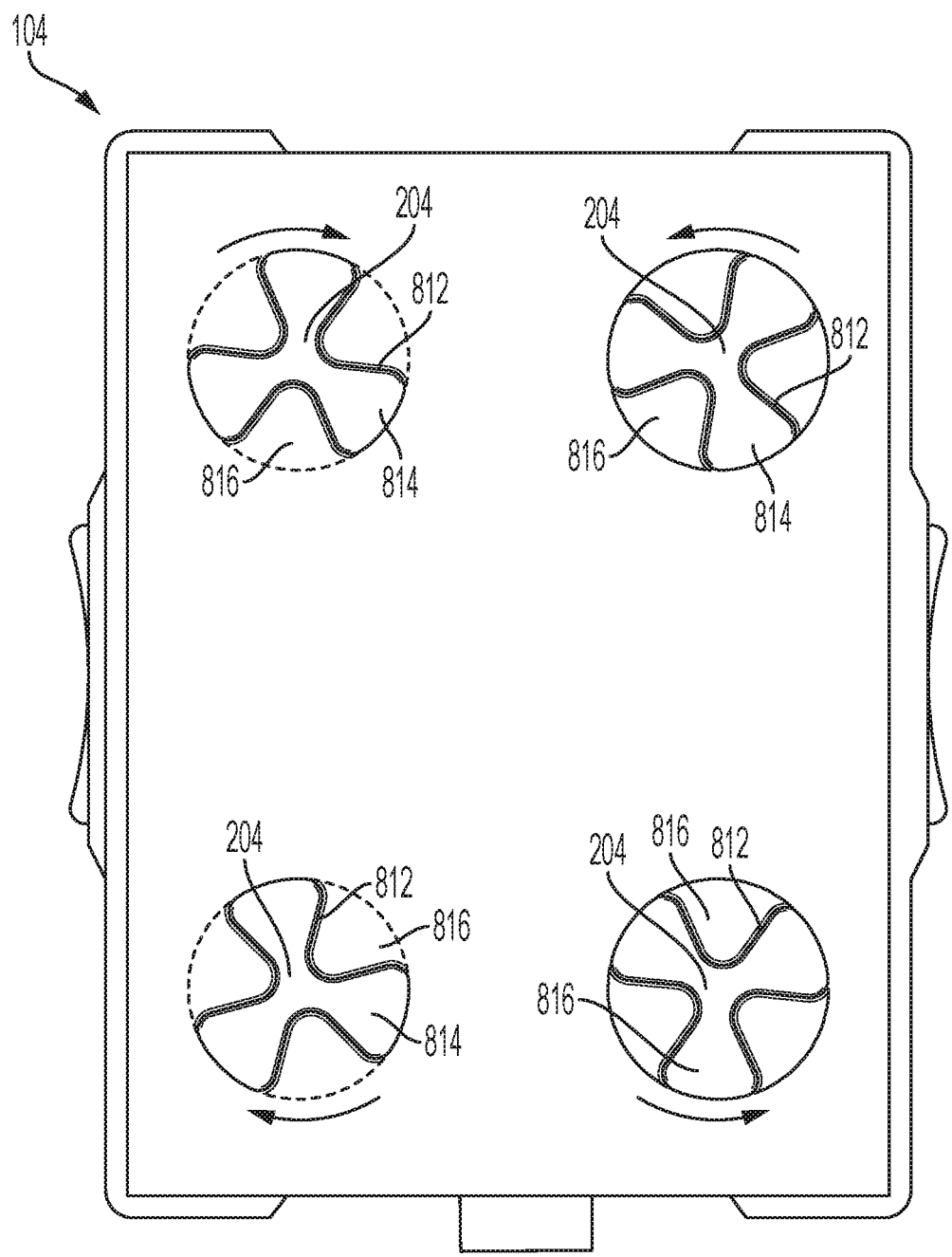
FIG. 8C is a diagrammatic view of the external member in a release position illustrating magnetic pole pairs according to aspects of the disclosure.
Figure 8D:
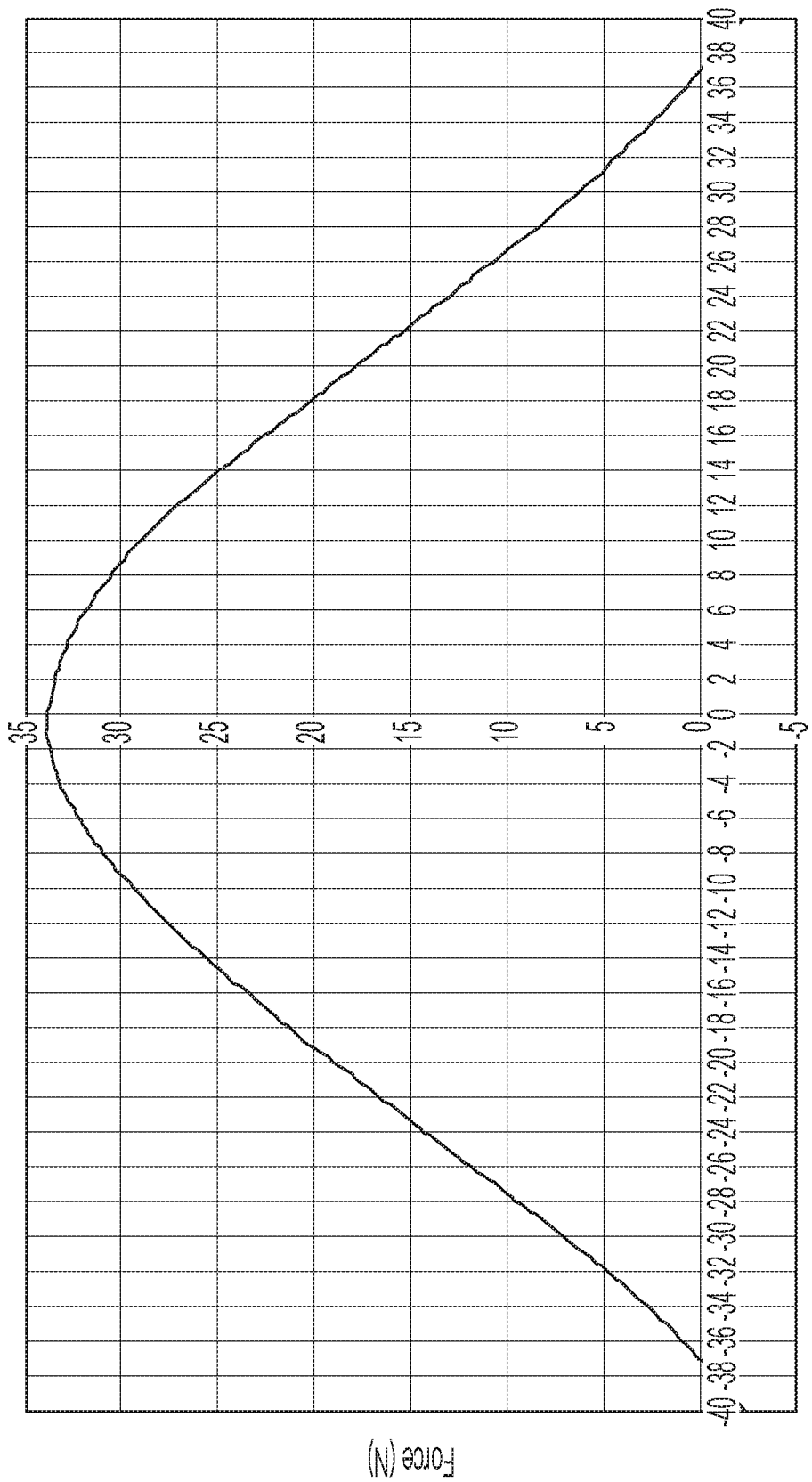
FIG. 8D is a graphical depiction of attractive force between magnets as a function of rotation of the magnets according to aspects of the disclosure.

FIG. 8C is a diagrammatic view of the external member 104 in a release position illustrating magnetic pole pairs. As described above, the first release arm 106 and the second release arm 108 may be actuated to rotate the second magnets 204 from the locking position to a release position. In a typical embodiment, the second magnets 204 rotate in a plane that is parallel to a plane of the inner face 403. When the second magnets 204 are moved to the release position, an angular position of the first magnetic pole 814 and the second magnetic pole 816 of the second magnets 204 changes. Such an adjustment of the position of the first magnetic pole 814 and the second magnetic pole 816 causes the first magnetic pole 814 to not be in alignment with the second magnetic pole 806 of the first magnets 202. Likewise, when in the release position, the second magnetic pole 816 is not in alignment with the first magnetic pole 804 of the first magnets 202. Such misalignment of the poles of the first magnets 202 and the second magnets 204 causes the magnetic force of attraction between the first magnets 202 and the second magnets 204 to be reduced such that the external member 104 may be de-coupled from the internal member 102. In various embodiments, the first magnets 202 and the second magnets 204 include pole pairs that are arranged to release upon approximately 30 degrees of rotation to approximately 40 degrees of rotation of the second magnets 204 relative to the first magnets 202. The attractive force present between the first magnets 202 and the second magnets 204, as a function of relative rotation, is illustrated graphically in FIG. 8D.

Figures 9E, 9F:
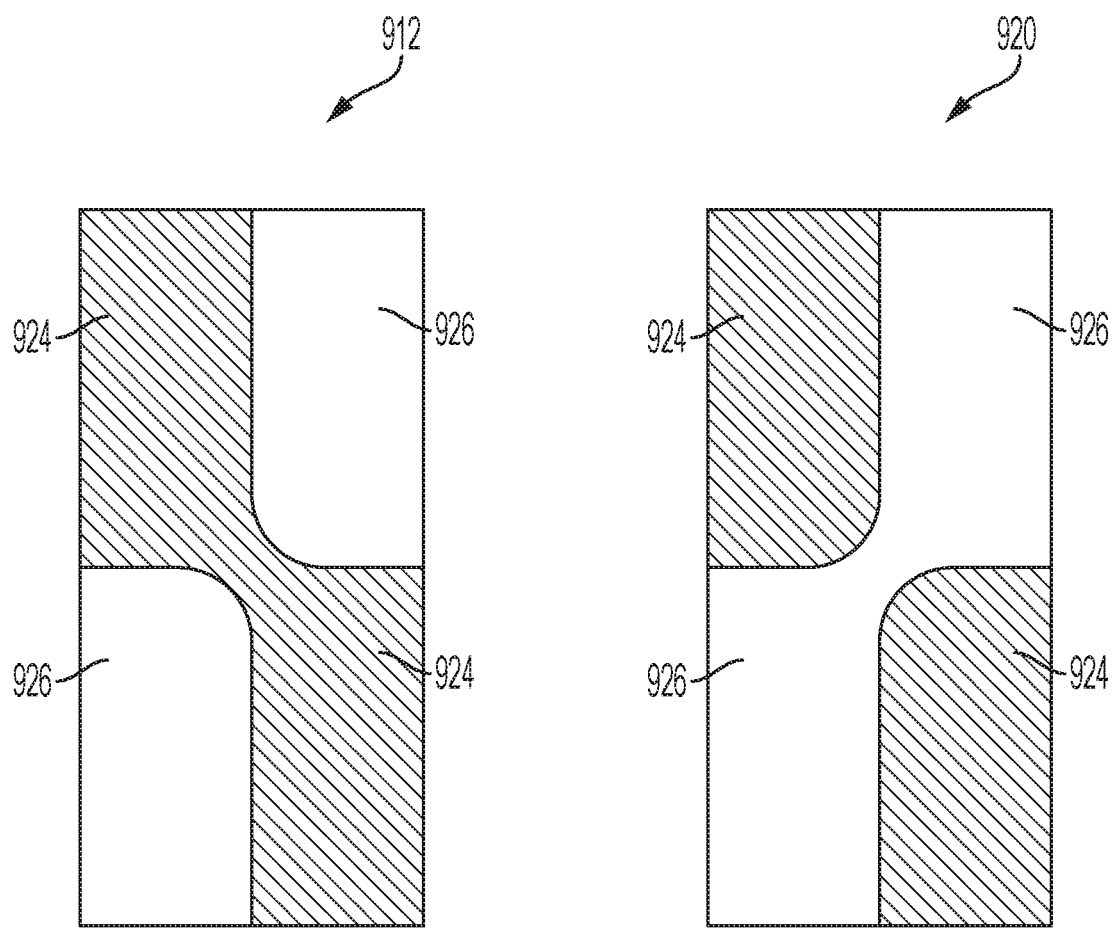
FIG. 9E is an enlarged view of an outward face of one of first magnets as illustrated in FIG. 9A.
FIG. 9F is an enlarged view of an outward face of one of second magnets as illustrated in FIG. 9B.
Figure 9H:
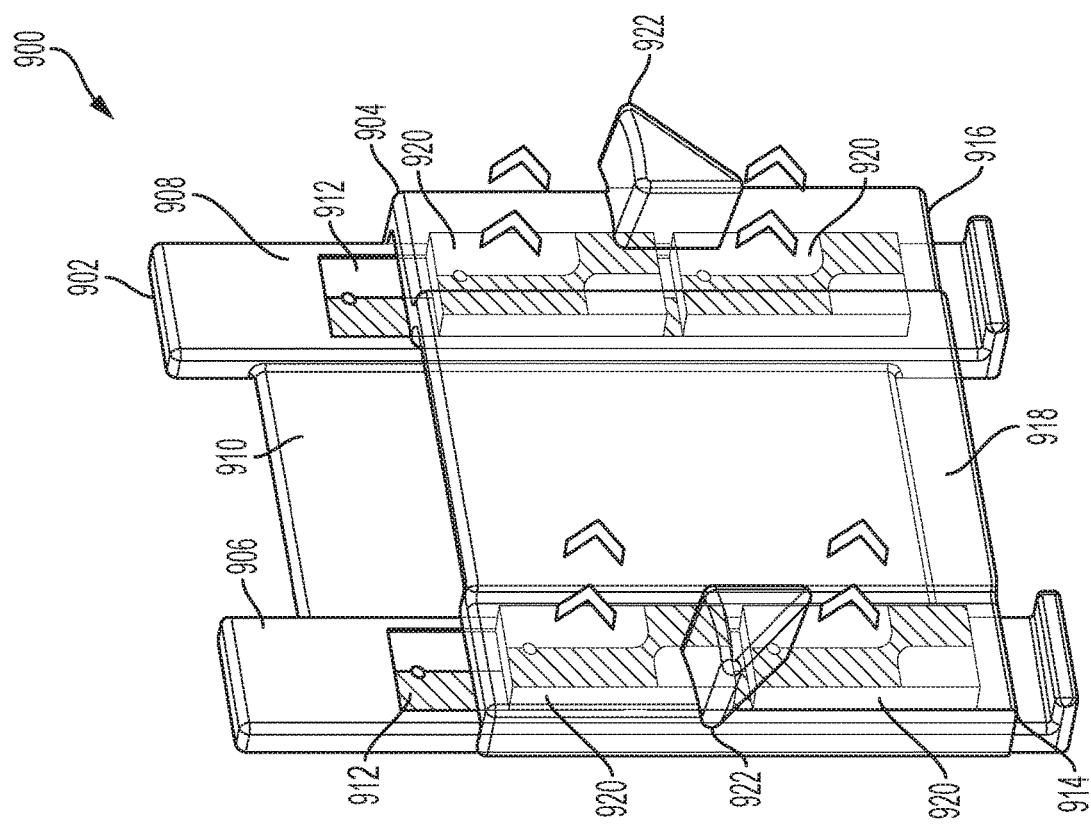
FIG. 9H illustrates the internal member and the external member in a release position.
Figure 9G:
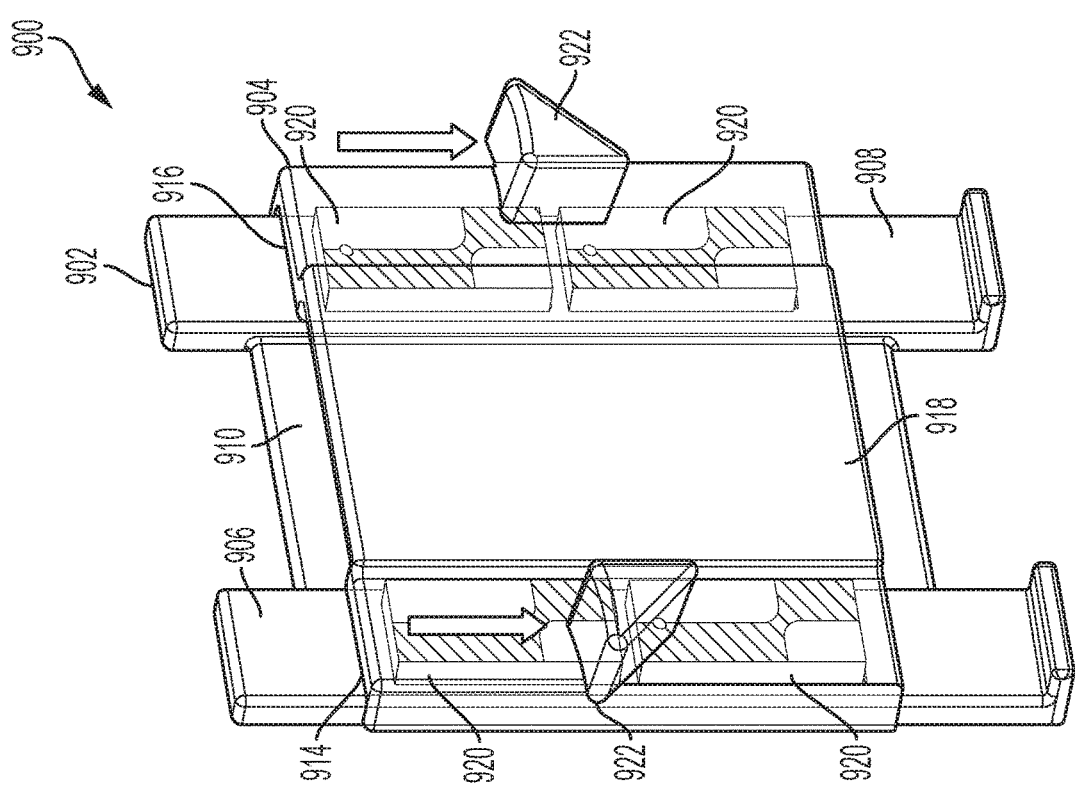
FIG. 9G illustrates the internal member and the external member mated together to form the sliding mounting device in a locking position.

Referring now to FIGS. 9A-9D, FIG. 9A is a front perspective view of an internal member 902 of a sliding mounting device 900 (illustrated in FIGS. 9G-9H). FIG. 9B is a back perspective view of the internal member 902. In a typical use scenario, the internal member 902 is worn under a garment such as a uniform shirt with a front side as illustrated in FIG. 9A facing toward the uniform shirt.

The internal member 902 includes a first track 906 and a second track 908 arranged generally parallel to each other. A first web 910 disposed between the first track 906 and the second track 908 couples the first track 906 to the second track 908. Two first magnets 912 are disposed on each of the first track 906 and the second track 908. A pattern of poles of the first magnets 912 is shown in FIG. 9A as an example and in more detail in FIG. 9E. By way of example, the embodiment illustrated in FIGS. 9A-9B shows two of the first magnets 912 disposed on the first track 906 and two of the first magnets 912 disposed on the second track 908; however, in other embodiments, any suitable number of first magnets 912 may be disposed on each of the first track 906 and the second track 908.

In various embodiments, the first track 906 and the second track 908 of the internal member 902 each exhibit a generally planar outer surface so as to facilitate mating of the internal member 902 and the external member 904 as shown in FIGS. 9A-9B. In other embodiments, however, the first track 906 and the second track 908 may exhibit other surface shapes. For example, in various embodiments, the first track 906 and the second track 908 could be angled or curved relative to the web 910. The web 910 as illustrated is recessed relative to the first track 906 and the second track 908.

Referring now to FIGS. 9C-9D, an external member 904 of the sliding mounting device 900 includes a first engagement face 914 and a second engagement face 916 arranged generally parallel to each other. FIG. 9C is a front perspective view of the external member 904. FIG. 9D is a back perspective view of the external member 904. In a typical use scenario, the external member 904 is worn over a garment such as a uniform shirt with the front side of the external member 904 facing the uniform shirt. A second web 918 disposed between the first engagement face 914 and the second engagement face 916 couples the first engagement face 914 to the second engagement face 916. The web 918 as illustrated is recessed relative to the first engagement face 914 and the second engagement face 916.

Two second magnets 920 are disposed on the first engagement face 914 and two second magnets 920 are disposed on the second engagement face 916. By way of example, FIGS. 9C-9D show the two second magnets 920 disposed on the first engagement face 914 and the two second magnets 920 disposed on the second engagement face 916; however, in other embodiments, any number of second magnets 920 may be disposed on each of the first engagement face 914 and the second engagement face 916. A pattern of poles of the second magnets 920 is shown in FIG. 9C as an example and in more detail in FIG. 9F.

FIG. 9D illustrates that the external member 904 includes two finger rests 922 that protrude laterally from opposite sides of the external member 904. In other embodiments, one or three or more finger rests 922 may be disposed on the external member 904. During use, the finger rests 922 facilitate application of forces to the external member 904 to induce the external member 904 to slide vertically relative to the internal member 902 as indicated by arrows in FIG. 9G. In various embodiments, the first engagement face 914 and the second engagement face 916 exhibit a shape complementary to the first track 906 and the second track 908 to facilitate mating of the internal member 902 and the external member 904 as illustrated in more detail in FIGS. 9G-9H.

FIG. 9E is an enlarged view of an outward face of one of the first magnets 912 as illustrated in FIG. 9A. FIG. 9F is an enlarged view of one of the second magnets 920 as illustrated in FIG. 9B. The first magnet 912 includes a first pole 924 and an oppositely charged second pole 926 arranged in a pattern on a face thereof. The second magnet 920 similarly includes a first pole 924 and an oppositely-charged second pole 926 arranged in a pattern on a face thereof. When the first magnet 912 and the second magnet 920 are aligned to face one another, the first pole 924 of the first magnet 912 and the second pole 926 of the second magnet 920 are aligned with one another and, in similar fashion, the second pole 926 of the first magnet 912 and the first pole 924 of the second magnet 920 are aligned with one another. When the poles of the respective magnets 912 and 920 are so aligned, the magnets 912 and 920 attract one another. In contrast, when the poles 924 and 926 of the first magnet 912 and the second magnet 920 are misaligned such that poles 924 or 926 of the respective magnets are facing one another, magnetic repulsion will tend to occur.

FIGS. 9G-9H illustrates the internal member 902 and the external member 904 mated together to form the sliding mounting device 900. The sliding mounting device 900 is shown in FIG. 9G in a locking position. For ease of illustration of interaction between the internal member 902 and the external member 904, the external member is illustrated in FIG. 9G as translucent.

During mating of the external member 904 and the internal member 902, the first engagement face 914 and the second engagement face 916 are received onto the first track 906 and the second track 908. The external member 904 may be slidably moved relative to the internal member 902 as indicated by downward-facing arrows in FIG. 9G to transition the sliding mounting device 900 from the locking position shown in FIG. 9G to a release position shown in FIG. 9H.

When the internal member 902 and the external member 904 are mated and are therefore in the locking position, the second web 918 does not contact the first web 910, due to the fact the each of the first web 910 and the second web 918 is recessed as discussed above, which lack of contact serves to reduce friction between the internal member 902 and the external member 904 and to facilitate vertical sliding movement of the external member 904 relative to the internal member 902.

When the external member 904 is in the locking position, as shown in FIG. 9G, such that the internal member 902 and the external member are mated with one another, the first pole 924 of each of the first magnets 912 aligns with one of the second poles 926 of a corresponding one of the second magnets 920. Likewise, each of the second poles 926 of the first magnets 912 aligns with one of the first poles 924 of a corresponding one of the second magnets 920. This alignment of the first poles 924 with the second poles 926 results in magnetic attraction that couples the internal member 902 to the external member 904 such that the internal member 902 and the external member 904 are mated in the locking position as shown in FIG. 9G.

When it is desired to de-couple the external member 904 from the internal member 902, a downward vertical force is applied to the finger rests 922, which direction is generally perpendicular to the magnetic force of attraction and indicated by arrows in FIG. 9G. The downward vertical force induces sliding movement of the external member 904 relative to the internal member 902. The sliding movement of the external member 904 relative to the internal member 902 disrupts the alignment of the first poles 924 of the first magnets 912 with the second poles 926 of the second magnet 920 such that the magnetic force of attraction therebetween is reduced and, by virtue of the arrangement of the first poles 924 of the first magnets 912 and the second poles 926 of the second magnets 920, the first poles 924 of the first magnets 912 become more aligned with the first poles 924 of the second magnets 920 and the second poles 926 of the first magnets 912 become more aligned with the second poles 926 of the second magnets 920. Such misalignment of the poles of the first magnets 912 and the second magnets 920 causes a reduction in the magnitude of the force of attraction and an increase in a force of repulsion between the internal member 902 and the external member 904 such that the external member 904 is decoupled from the internal member 902 into the release position as shown in FIG. 9H, arrows in FIG. 9H illustrating the force of repulsion of the external member 904 and the internal member 902 from one another.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A mounting device comprising:
   an internal member comprising:
      first magnets disposed in an inner face of the internal member;
      one or more shock cavities formed in the inner face of the internal member and disposed outwardly of the first magnets;
      one or more alignment ridges disposed in the inner face of the internal member inwardly of the first magnets;
      one or more inserts disposed in the one or more shock cavities; and
   an external member removably coupled to the internal member, the external member comprising:
      second magnets disposed in an inner face of the external member at positions corresponding to the first magnets, the second magnets being rotatable between a locking position and a release position;
      one or more shock ridges formed in the inner face of the external member at positions corresponding to the one or more shock cavities;
      one or more alignment slots disposed in the inner face of the external member at positions corresponding to the one or more alignment ridges;
   wherein when the external member is coupled to the internal member:
      each alignment ridge is received into the corresponding alignment slot such that the external member and the internal member are aligned; and
      wherein each shock ridge is received into the corresponding shock cavity and compresses the corresponding insert such that impact is dampened during coupling of the internal member to the external member.

2. The mounting device of claim 1, wherein the external member comprises:
   a first release arm extending from the external member and operatively coupled to the second magnets; and
   a second release arm extending from the external member and operatively coupled to the second magnets.

3. The mounting device of claim 2, wherein:
   actuation of the first release arm and the second release arm rotates the second magnets from the locking position to the release position, the release position facilitating de-coupling of the external member from the internal member; and
   the second magnets rotate in a plane that is parallel to a plane of the inner face of the external member.

4. The mounting device of claim 1, wherein the one or more shock cavities comprises a first shock cavity and a second shock cavity.

5. The mounting device of claim 4 wherein the one or more shock ridges comprises a first shock ridge and a second shock ridge, the first shock ridge and the second shock ridge being disposed outwardly of the second magnets.

6. The mounting device of claim 1, wherein:
   the first magnets are recessed into the inner face of the internal member; and
   the second magnets are recessed into the inner face of the external member.

7. The mounting device of claim 6, wherein a gap is defined between the first magnets and the second magnets when the internal member is coupled to the external member.

8. A mounting device comprising:
   an internal member, the internal member comprising:
      first magnets disposed in an inner face of the internal member;
      one or more shock cavities formed in the inner face of the internal member and disposed outwardly of the first magnets;
      one or more alignment ridges disposed in the inner face of the internal member inwardly of the first magnets;
      one or more inserts disposed in the one or more shock cavities; and
   an external member that is removably coupled to the internal member, the external member comprising:
      second magnets disposed in an inner face of the external member at positions corresponding to the first magnets;
      one or more shock ridges formed in the inner face of the external member at positions corresponding to the one or more shock cavities;
      one or more alignment slots disposed in the inner face of the external member at positions corresponding to the one or more alignment ridges;
      a first release arm extending from the external member and operatively coupled to the second magnets; and
      a second release arm extending from the external member and operatively coupled to the second magnets; and
   wherein actuation of the first release arm and the second release arm rotates the second magnets from a locking position to a release position, the release position facilitating de-coupling of the external member from the internal member.

9. The mounting device of claim 8, comprising a first magnet housing and a second magnet housing operatively coupled to the first release arm and the second release arm, respectively, the first magnet housing and the second magnet housing receiving the second magnets.

10. The mounting device of claim 9, wherein:
    the first magnet housing and the second magnet housing are rotatable between the locking position and the release position; and
    the first magnet housing and the second magnet housing rotate in a plane that is parallel to a plane of the inner face of the external member.

11. The mounting device of claim 10, wherein applying compression to the first release arm and the second release arm rotates the first magnet housing and the second magnet housing to the release position.

12. The mounting device of claim 10, wherein applying tension to the first release arm and the second release arm rotates the first magnet housing and the second magnet housing to the release position.

13. The mounting device of claim 8, wherein:
    the first magnets are recessed into the inner face of the internal member; and
    the second magnets are recessed into the inner face of the external member.

14. The mounting device of claim 13, wherein a gap is defined between the first magnets and the second magnets when the internal member is coupled to the external member.

15. A method of using a mounting device, the method comprising:
- aligning an external member with an internal member, the internal member comprising:
  - first magnets disposed in an inner face of the internal member;
  - one or more shock cavities formed in the inner face of the internal member and disposed outwardly of the first magnets;
  - one or more alignment ridges disposed in the inner face of the internal member inwardly of the first magnets;
  - one or more inserts disposed in the one or more shock cavities; and
- the external member comprising:
  - second magnets disposed in an inner face of the external member at positions corresponding to the first magnets, the second magnets being rotatable between a locking position and a release position;
  - one or more shock ridges formed in the inner face of the external member at positions corresponding to the one or more shock cavities;
  - one or more alignment slots disposed in the inner face of the external member at positions corresponding to the one or more alignment ridges;
- coupling the external member to the internal member via a magnetic force of attraction between first magnets disposed in the internal member and second magnets disposed in the external member;
- actuating a first release arm and a second release arm that are coupled to the external member, actuation of the first release arm and the second release arm causing the second magnets to rotate from a locking position to a release position; and
- de-coupling the external member from the internal member.

16. The method of claim 15, wherein the actuating comprises compressing the first release arm and the second release arm.

17. The method of claim 15, wherein the actuating comprises applying tension to the first release arm and the second release arm.

18. The method of claim 15, comprising, during coupling of the external member to the internal member, dampening an impact of the external member with the internal member.

19. The method of claim 18, wherein the dampening comprises compressing, with the external member, an insert disposed in a shock cavity formed in an inner face of the internal member.

* * * * *